Patented Jan. 16, 1923.

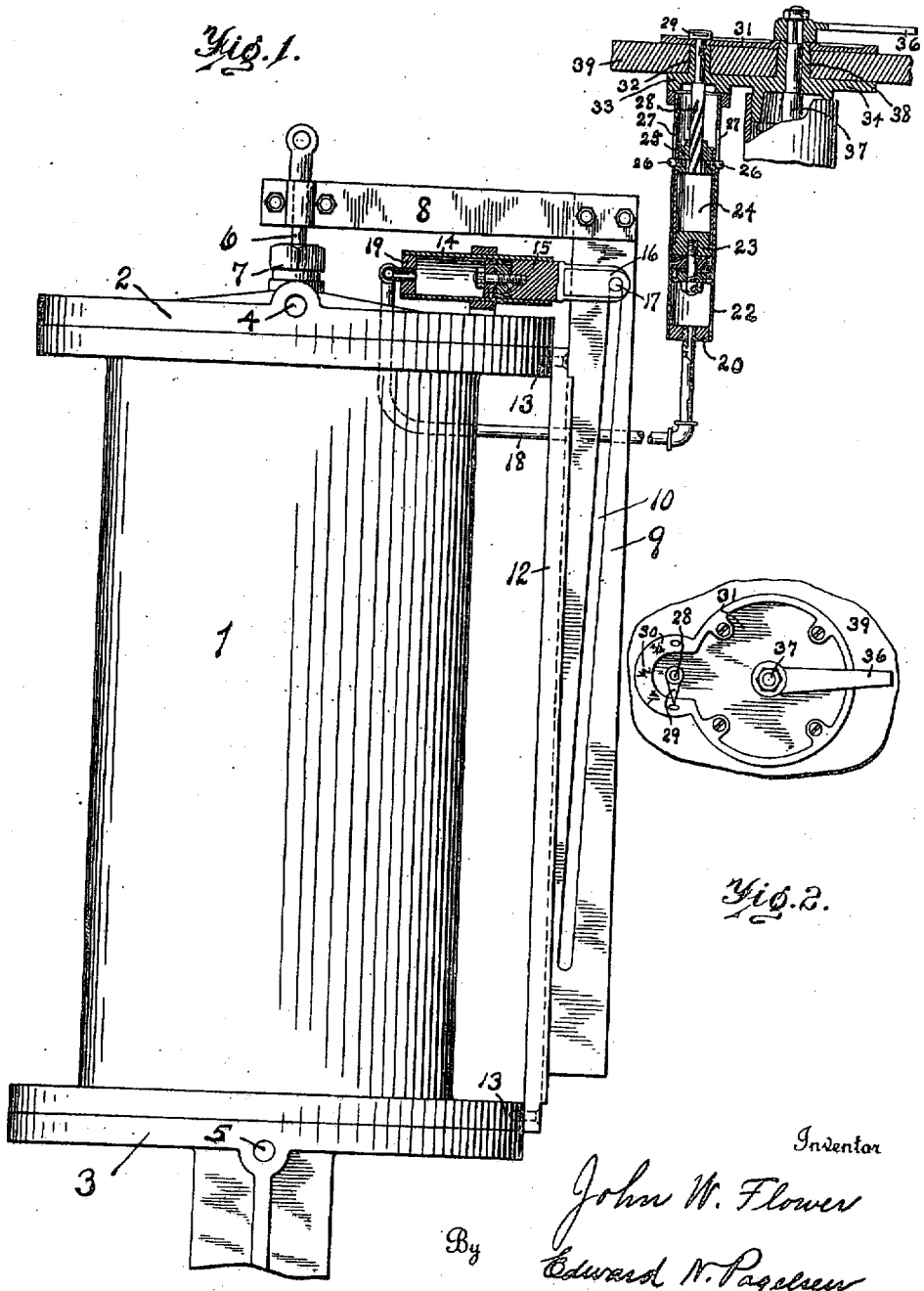

1,442,716

UNITED STATES PATENT OFFICE.

JOHN W. FLOWER, OF DETROIT, MICHIGAN.

INDICATING MECHANISM.

Application filed September 18, 1922. Serial No. 589,030.

*To all whom it may concern:*

Be it known that I, JOHN W. FLOWER, a citizen of the United States, and residing at Detroit, in the county of Wayne and State of Michigan, have invented a new and improved Indicating Mechanism, of which the following is a specification.

This invention relates broadly to means for indicating the relative position of a movable member, but specifically, it relates to means for indicating the extent of opening of gate valves which are operated by hydraulic cylinders, the indicating mechanism being preferably positioned adjacent the controlling device for the valve-operating mechanism, and the object of this invention is to produce an indicating mechanism of this character which shall be simple in construction, positive in its operation, which can be located at any convenient location relative to the valve, and which can be produced at relatively low cost.

This invention consists in the construction illustrated in the accompanying drawing and particularly pointed out in the claims.

In the accompanying drawing, Fig. 1 is an elevation of a hydraulic cylinder and a vertical section of the indicating mechanism therefor. Fig. 2 is a plan of a portion of the indicating mechanism.

Similar reference characters refer to like parts in both views.

The cylinder 1 is provided with the usual heads 2 and 3 and these heads are shown provided with openings 4 and 5 to receive the pipes for the operating liquid which forces the piston within the cylinder up or down. As the construction of the piston and of the mechanism to be operated thereby forms no part of the present invention, they are not shown.

A rod 6 extends slidably up through a stuffing box 7 on the head 2 and may be considered as an extension of the main piston rod. Instead of this hydraulic cylinder, any other means may be employed to operate this rod 6 in harmony with the mechanism which is to be controlled thereby. Attached to the rod 6 is a bar 8 to whose outer end is connected a cam plate 9 having a diagonal slot 10. A channel shaped guide 12 may be attached at its upper and lower ends to the flanges 13 of the hydraulic cylinder 1.

Mounted on the head 2 is a cylinder 14 in which the piston 15 is slidable. The outer end 16 of the piston is bifurcated and carries a pin 17 which is slidable in the cam slot 10. A pipe 18 is connected into the head 19 of the cylinder 14 and into the head 20 of the cylinder 22. A piston 23 is slidable in this cylinder and connects to a sleeve 24 in whose outer end a nut 25 is secured, the nut and sleeve being prevented from turning by means of the screws 26 which extend through the slots 27 in the wall of the cylinder 22.

This nut 25 is fitted on a screw 28 whose pitch is so coarse that the nut can slide up and down freely and turn this screw 28 and thereby swing the pointer 29 attached to its upper end over the graduations or indicating characters 30 on the plate 31. This screw is mounted in the hub 32 of the head 33 of the cylinder 22 and this hub is attached to a plate 34, which, together with the plate 31, are secured to the table 39.

Any desired means may be employed to control the flow of the operating liquid to the ends of the cylinder 1 and I have shown a handle 36 attached to a shaft 37 which is mounted in a hub 38 connected to the same plate 34 which supports the hub 30. The mechanism which connects this shaft 37 to the valves and the valves themselves are omitted as they are well known and form no part of this invention.

When the valve or other device which is actuated by the hydraulic cylinder 1 and the mechanism therein is to be moved from one position to another, the handle 36 is swung so as to cause the operating liquid to enter through either of the openings 5 or 4, which will cause the stem 6 to move up or down. An upward movement will force the piston 15 inward and cause the piston 23 to move up and thus cause the indicator 29 to travel clockwise over the graduations shown in Fig. 2. The operator can thereby determine the position of the piston within the cylinder and the position of the parts connected thereto.

The details of construction and the proportions of the parts of this indicating mechanism may all be changed by those skilled in the art without departing from the spirit of my invention as set forth in the following claims.

I claim:—

1. In an indicating mechanism, the combination of a longitudinally movable rod, a plate and having a slot forming an angle with the axis of said rod, means to connect the plate to the rod, a cylinder and a piston therefor and means connected to the piston whereby the walls of said inclined slot may move the piston in or out as the plate is moved longitudinally in either direction by said rod, a second cylinder and a piston therein, a nut connected to said second piston, a screw threaded shaft mounted in said nut adapted to be turned thereby as said piston moves longitudinally in said cylinder, an indicator connected thereto, and a pipe connecting the two cylinders to convey an operating fluid from one to the other.

2. In an indicating mechanism, a cam operatively connected to the part whose movement is to be indicated, a cylinder, a piston therein, means connecting the piston to the cam whereby the piston may be moved in the cylinder in proportion to the movements of the cam, a second cylinder and a piston therein, a pipe connecting said cylinders to conduct fluid whereby the movement of one piston may cause a corresponding movement of the other, and an indicator connected to the second piston.

3. In an indicating mechanism, a cam operatively connected to the part whose movement is to be indicated, a cylinder, a piston therein, means connecting the piston to the cam whereby the piston may be moved in the cylinder in proportion to the movements of the cam, a second cylinder and a piston therein, a pipe connecting said cylinders to conduct fluid whereby the movement of one piston may cause a corresponding movement of the other, an indicator connected to the second piston, said indicator comprising a rotatable shaft having a pointer at one end and a helical groove at the other, a graduated plate over which the pointer may swing, a nut fitting on the shaft and in said groove and attached to said second piston, and means to prevent the nut from turning.

4. In combination with a hydraulic valve-operating cylinder and a head therefor, a rod slidable in said head, a plate having a cam slot at an angle to the line of the rod, means to connect the plate to the rod, a second cylinder mounted on the head of the hydraulic cylinder, a piston slidable in the second cylinder, a pin mounted in the piston and extending into the cam slot whereby the piston may be moved in and out as said rod moves in the head of the hydraulic cylinder, a third cylinder, a piston therein, a conductor pipe connected to the second and third cylinder to convey operating fluid from one to the other whereby the movement of one piston may cause a corresponding movement of the other, and an indicator connected to and positioned by the piston in the third cylinder.

JOHN W. FLOWER.